(12) United States Patent
Sakai et al.

(10) Patent No.: US 11,237,607 B2
(45) Date of Patent: Feb. 1, 2022

(54) ELECTRONIC APPARATUS, AND METHOD AND COMPUTER-READABLE MEDIUM THEREFOR

(71) Applicant: Brother Kogyo Kabushiki Kaisha, Aichi (JP)

(72) Inventors: Katsunori Sakai, Toyokawa (JP); Hajime Usami, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 544 days.

(21) Appl. No.: 15/939,651

(22) Filed: Mar. 29, 2018

(65) Prior Publication Data

US 2018/0284862 A1    Oct. 4, 2018

(30) Foreign Application Priority Data

Mar. 31, 2017   (JP) .............................. JP2017-073306

(51) Int. Cl.
*H02J 7/00* (2006.01)
*H02J 7/14* (2006.01)
(Continued)

(52) U.S. Cl.
CPC .......... *G06F 1/266* (2013.01); *G06F 13/4282* (2013.01); *H02J 7/0021* (2013.01); *G06F 2213/0042* (2013.01)

(58) Field of Classification Search
USPC ....................................................... 320/107
See application file for complete search history.

(56) References Cited

U.S. PATENT DOCUMENTS 5,926,007 A * 7/1999 Okada .................. H02J 7/0047
320/132
7,159,132 B2   1/2007 Takahashi et al.
(Continued)

FOREIGN PATENT DOCUMENTS

JP   2000-082015 A   3/2000
JP   2003-263245 A   9/2003
(Continued)

OTHER PUBLICATIONS

Apr. 27, 2021—(JP) Notice of Reasons for Refusal—App 2017-073306.
(Continued)

*Primary Examiner* — Alexis B Pacheco
(74) *Attorney, Agent, or Firm* — Banner & Witcoff, Ltd.

(57) ABSTRACT

An electronic apparatus includes a USB (Universal Serial Bus) interface configured to connect with a plurality of external devices and supply an electric power to each of the external devices connected with the interface, the plurality of external devices including a first device having a battery and a second device, and a controller configured to, when the first device and the second device are connected with the interface, determine whether the first device satisfies a first condition concerning charging of the battery of the first device, and in response to determining that the first device satisfies the first condition, make a specific ratio of an electric power to be supplied to the first device via the interface to an electric power to be supplied to the second device via the interface larger than when it is determined that the first device does not satisfy the first condition.

9 Claims, 5 Drawing Sheets

(51) Int. Cl.
  *G06F 1/26* (2006.01)
  *G06F 13/42* (2006.01)

(56) References Cited

U.S. PATENT DOCUMENTS

| | | | |
|---|---|---|---|
| 7,424,625 B2 | 9/2008 | Kawanabe | |
| 7,716,499 B2 | 5/2010 | Kobayashi | |
| 2002/0038432 A1* | 3/2002 | Hsu | G06F 1/266 |
| | | | 713/300 |
| 2003/0088798 A1 | 5/2003 | Ono et al. | |
| 2003/0172312 A1 | 9/2003 | Takahashi et al. | |
| 2004/0187042 A1 | 9/2004 | Kawanabe | |
| 2007/0049058 A1 | 3/2007 | Kobayashi | |
| 2009/0100275 A1* | 4/2009 | Chang | G06F 1/266 |
| | | | 713/300 |
| 2009/0271048 A1* | 10/2009 | Wakamatsu | H02J 5/005 |
| | | | 700/296 |
| 2010/0033018 A1* | 2/2010 | Fukasawa | H02J 7/0036 |
| | | | 307/80 |
| 2011/0175576 A1 | 7/2011 | Uesaka et al. | |
| 2012/0126744 A1* | 5/2012 | Kuroda | H02J 7/042 |
| | | | 320/107 |
| 2014/0164805 A1 | 6/2014 | Hasui | |
| 2014/0225558 A1* | 8/2014 | Park | H02J 2207/40 |
| | | | 320/108 |
| 2015/0067374 A1 | 3/2015 | Kim | |
| 2015/0103516 A1* | 4/2015 | Maglica | H02J 7/0021 |
| | | | 362/183 |
| 2015/0263548 A1* | 9/2015 | Cooper | H02J 50/20 |
| | | | 320/108 |
| 2016/0072326 A1* | 3/2016 | Nilles | H02J 7/0071 |
| | | | 320/114 |
| 2016/0181839 A1* | 6/2016 | Racine | H02J 7/0026 |
| | | | 320/107 |
| 2016/0202743 A1* | 7/2016 | Li | G06F 13/4282 |
| | | | 710/313 |
| 2016/0329724 A1* | 11/2016 | Ibrahim | H02J 7/007 |
| 2017/0005494 A1* | 1/2017 | Li | G06F 1/263 |
| 2017/0025876 A1* | 1/2017 | Chan | H02J 7/345 |
| 2017/0321853 A1* | 11/2017 | Chien | G03B 23/00 |
| 2018/0076633 A1* | 3/2018 | Fujita | H01M 10/46 |
| 2018/0212470 A1* | 7/2018 | Leem | H02J 7/0077 |
| 2020/0310705 A1* | 10/2020 | Kato | H04L 12/40045 |

FOREIGN PATENT DOCUMENTS

| | | |
|---|---|---|
| JP | 2004-070785 A | 3/2004 |
| JP | 2004-284173 A | 10/2004 |
| JP | 2007-062154 A | 3/2007 |
| JP | 2012-075313 A | 4/2012 |
| JP | 2012-182930 A | 9/2012 |
| JP | 2014-042426 A | 3/2014 |
| JP | 2014-107884 A | 6/2014 |
| JP | 2014-115687 A | 6/2014 |
| JP | 2015-174373 A | 10/2015 |

OTHER PUBLICATIONS

Dec. 8, 2020—(JP) Notice of Reasons for Refusal—App 2017-073306.
Oct. 26, 2021—(JP) Decision of Refusal—App 2017-073306.

* cited by examiner

ELECTRONIC APPARATUS, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2017-073306 filed on Mar. 31, 2017. The entire subject matter of the Applications is incorporated herein by reference.

BACKGROUND

Technical Field

Aspects of the present disclosure are related to an electronic apparatus, and a method and a non-transitory computer-readable medium therefor.

Related Art

An electronic apparatus such as a multi-function peripheral (hereinafter referred to as an "MFP") has a universal serial bus (hereinafter referred to as a "USB") interface connectable with external devices.

The USB interface is configured to perform data communication with the external devices and supply an electric power to each of the external devices connected with the interface. Therefore, an external device complying with a power feeding standard for the USB interface may operate without an external power supply, by an electric power supplied via the USB interface. Further, an external device with a battery incorporated therein may charge the battery with an electric power supplied via the USB interface.

SUMMARY

When the USB interface is connected with not only one external device but also another external device, the two external devices are supplied with electricity via the USB interface. However, a power supply circuit of the electronic apparatus has a limited power supply capacity. Therefore, when the two external devices are connected with the USB interface, power feeding management is required for the external devices.

Aspects of the present disclosure are advantageous to provide one or more techniques, for an electronic apparatus, which make it possible to supply an electric power to each of external devices connected with a power-feedable interface (e.g., a USB interface) of the electronic apparatus, in a user-friendly manner.

According to aspects of the present disclosure, an electronic apparatus is provided, which includes a USB interface configured to connect with a plurality of external devices and supply an electric power to each of the external devices connected with the USB interface, the plurality of external devices including a first device having a battery and a second device. The electronic apparatus further includes a controller configured to, when the first device and the second device are connected with the USB interface, determine whether the first device satisfies a first condition concerning charging of the battery of the first device, and in response to determining that the first device satisfies the first condition, make a specific ratio larger than when it is determined that the first device does not satisfy the first condition, the specific ratio being a ratio of an electric power to be supplied to the first device via the USB interface to an electric power to be supplied to the second device via the USB interface.

According to aspects of the present disclosure, further provided is a method implementable on a processor coupled with an electronic apparatus. The electronic apparatus includes a USB interface configured to connect with a plurality of external devices and supply an electric power to each of the external devices connected with the USB interface, the plurality of external devices including a first device having a battery and a second device. The method includes determining, when the first device and the second device are connected with the USB interface, whether the first device satisfies a first condition concerning charging of the battery of the first device, and in response to determining that the first device satisfies the first condition, making a specific ratio larger than when it is determined that the first device does not satisfy the first condition, the specific ratio being a ratio of an electric power to be supplied to the first device via the USB interface to an electric power to be supplied to the second device via the USB interface.

According to aspects of the present disclosure, further provided is a non-transitory computer-readable medium storing computer-readable instructions that are executable by a processor coupled with an electronic apparatus. The electronic apparatus includes a USB interface configured to connect with a plurality of external devices and supply an electric power to each of the external devices connected with the USB interface, the plurality of external devices including a first device having a battery and a second device. The instructions are configured to, when executed by the processor, cause the processor to, when the first device and the second device are connected with the USB interface, determine whether the first device satisfies a first condition concerning charging of the battery of the first device, and in response to determining that the first device satisfies the first condition, make a specific ratio larger than when it is determined that the first device does not satisfy the first condition, the specific ratio being a ratio of an electric power to be supplied to the first device via the USB interface to an electric power to be supplied to the second device via the USB interface.

BRIEF DESCRIPTION OF THE ACCOMPANYING DRAWINGS

Figure 5:
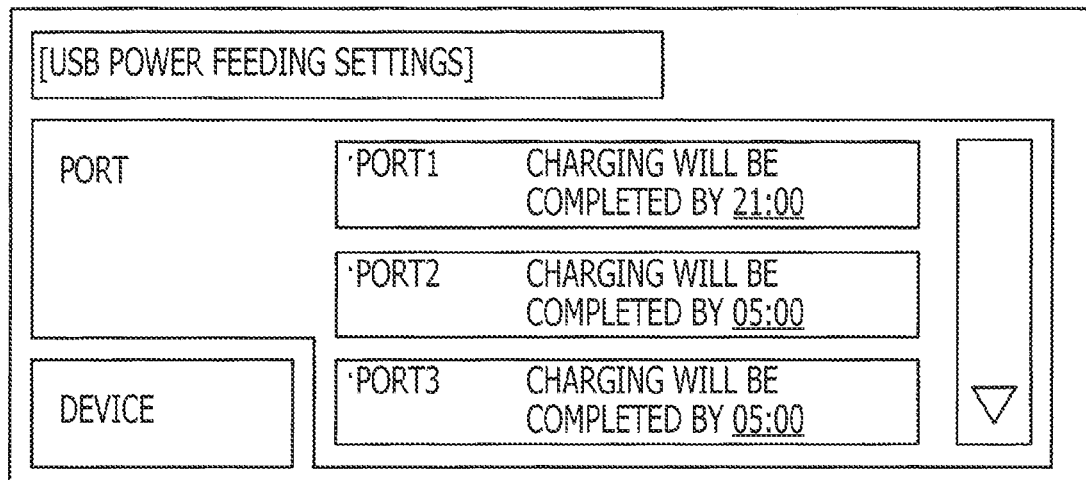

FIG. 5 exemplifies a setting screen for setting charging completion times in the second illustrative embodiment according to one or more aspects of the present disclosure.

Figure 6:
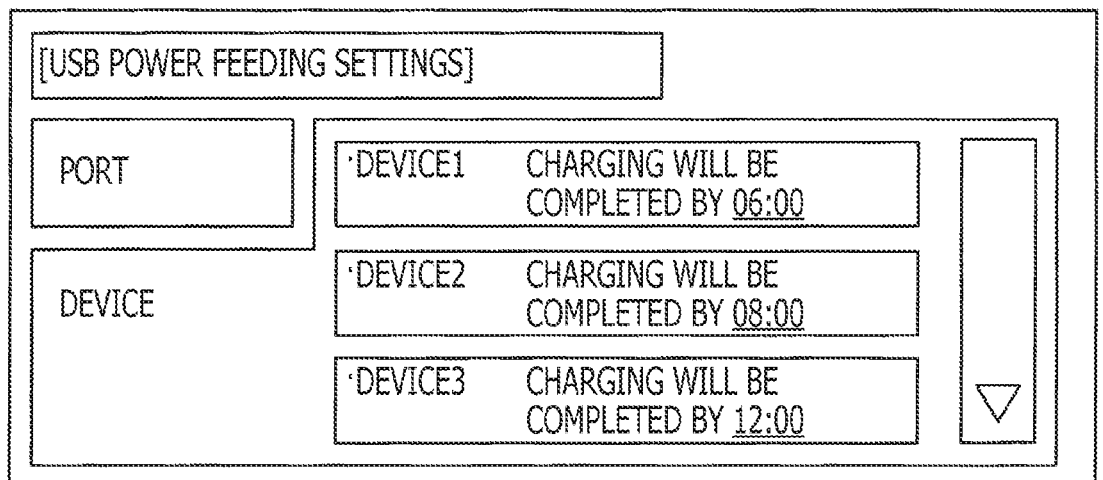

FIG. 6 exemplifies another setting screen for setting charging completion times in the second illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

<First Illustrative Embodiment>

Hereinafter, a first illustrative embodiment according to aspects of the present disclosure will be described with reference to relevant drawings.

<Electrical Configuration of MFP>

Figure 1:
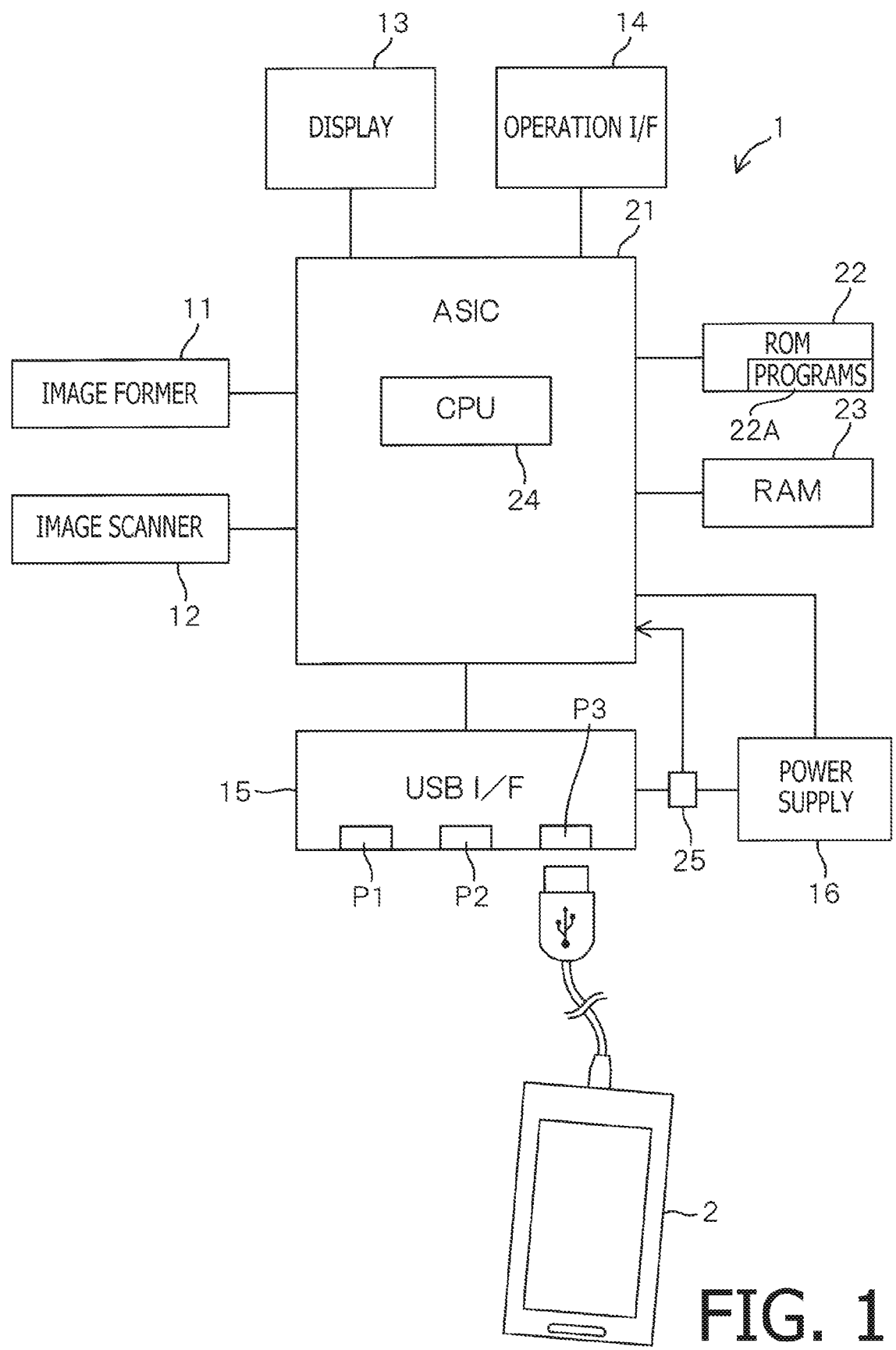
FIG. 1 is a block diagram schematically showing an electrical configuration of a multi-function peripheral (hereinafter referred to as an "MFP") in a first illustrative embodiment according to one or more aspects of the present disclosure.

As shown in FIG. 1, a multi-function peripheral (hereinafter referred to as an "MFP") 1 includes an image former 11, an image scanner 12, a display 13, an operation interface (hereinafter referred to as an "operation I/F") 14, a universal serial bus interface (hereinafter referred to as a "USB I/F") 15, and a power supply 16.

The image former 11 is configured to form an image (a color image or a monochrome image) based on image data on each of sheets being fed on a sheet-by-sheet basis along a conveyance path inside the MFP 1. An image forming method of the image former 11 may be an electrophotographic method or an inkjet method.

The image scanner 12 includes an image sensor and an analog front end (hereinafter referred to as an "AFE"). The image sensor 12 is configured to scan an image of a document sheet by the image sensor, output an analog image signal from the image sensor, and convert the analog image signal into digital image data via the AFE.

The display 13 includes a liquid crystal display device (hereinafter referred to as an "LCD device"). The display 13 is configured to display thereon various kinds of information.

The operation I/F 14 includes operable keys such as a start key, a numeric keypad, cursor keys, and a return key. A user may input various instructions by operating the operation I/F 14. The operation I/F 14 may be touch keys provided integrally on the display 13.

The USB I/F 15 is an interface for establishing a USB connection with one or more external devices 2. More specifically, the USB I/F 15 is an interface complying with USB standards, and is an interface based on technologies related to the USB standards. The USB I/F 15 includes USB ports P1, P2, and P3 into each of which a connector of a USB cable connected with an external device 2 or a USB connector of an external device 2 may be inserted. The USB I/F 15 is configured to perform data communication with one or more external devices 2 that are USB-connected with the USB I/F 15 and supply electricity to the one or more external devices 2.

The power supply 16 is connected with an commercial AC power supply. The power supply 16 is configured to convert electricity supplied from the commercial AC power supply into an electric power suitable for each of elements and supply the suitable electric power to each element.

Further, the MFP 1 includes an application specific integrated circuit (hereinafter referred to as an "ASIC") 21, a ROM 22, and a RAM 23.

The ASIC 21 includes a CPU 24. The ASIC 21 is configured to accept an input of image data acquired by the image scanner 12 and an input of an operation signal representing what kind of operation has been performed via the operation I/F 14. Further, the ASIC 21 is configured to accept an input of a detection signal output from an electric current sensor 25. It is noted that the electric current sensor 25 is configured to detect a value of an electric current supplied to each of the USB ports P1, P2, and P3 of the USB I/F 15 from the power supply 16, and output a detection signal representing the electric current value. The ASIC 21 is connected with the image former 11, the display 13, the USB I/F 15, and the power supply 16, as well as the image scanner 12 and the operation I/F 14.

The CPU 24 is configured to control each of elements by executing programs 22A stored in the ROM 22, based on signals input into the ASIC 21. The RAM 23 is used as a work area while the CPU 24 is controlling one or more elements by executing one or more programs 22A. The RAM 23 includes a non-volatile memory such as an NVRAM.

<Power Feeding Control Process>

Figure 2:
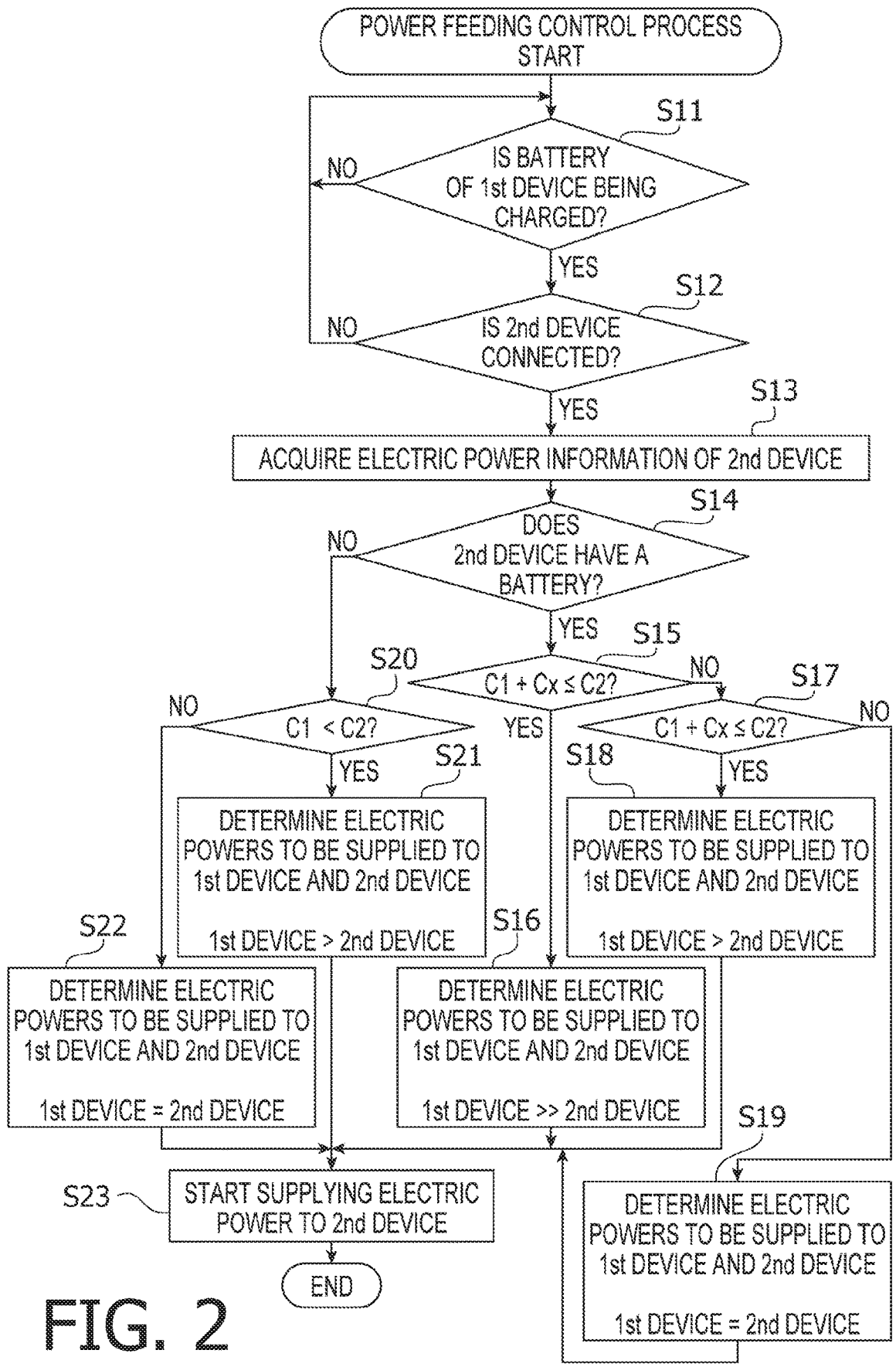
FIG. 2 is a flowchart showing a procedure of a power feeding control process in the first illustrative embodiment according to one or more aspects of the present disclosure.

When the MFP 1 is powered on, the CPU 24 performs a power feeding control process shown in FIG. 2.

In the power feeding control process, the CPU 24 determines whether an external device 2 is connected with the USB I/F 15 and whether a battery of the external device 2 (hereinafter referred to as a "first device 2A") is being charged by an electric power supplied to the first device 2A via the USB I/F 15 (S11).

When determining that the battery of the first device 2A is being charged (S11: Yes), the CPU 24 determines whether an external device 2 is newly connected to the USB I/F 15 (S12).

When determining that an external device 2 is not newly connected to the USB I/F 15 (S12; No), the CPU 24 again determines whether the battery of the first device 2A is being charged (S11).

When determining that an external device 2 is newly connected to the USB I/F 15 (S12; Yes), the CPU 24 acquires electric power information of the external device 2 (hereinafter referred to as a "second device 2B") (S13).

Specifically, the CPU 24 transmits, to the second device 2B, an inquiry about a charge amount of electric energy stored in the battery of the second device 2B. When receiving from the second device 2B information representing the charge amount of the battery of the second device 2B within a particular period of time after transmission of the inquiry, the CPU 24 determines that the second device 2B has a battery (S14: Yes), and stores into the RAM 23 a charge amount C2 represented by the information received from the second device 2B. Meanwhile, when not receiving from the second device 2B information representing the charge amount of the battery of the second device 2B within the particular period of time after transmission of the inquiry, the CPU 24 determines that the second device 2B does not have a battery (S14: No).

When determining that the second device 2B has a battery (S14: Yes), the CPU 24 determines whether a sum of a charge amount C1 of the battery of the first device 2A and a first particular amount Cx is equal to or smaller than the charge amount C2 of the battery of the second device 2B (S15). In other words, the CPU 24 determines whether the charge amount C1 of the battery of the first device 2A is smaller than the charge amount C2 of the battery of the second device 2B by the first particular amount Cx or more.

Figure 3:
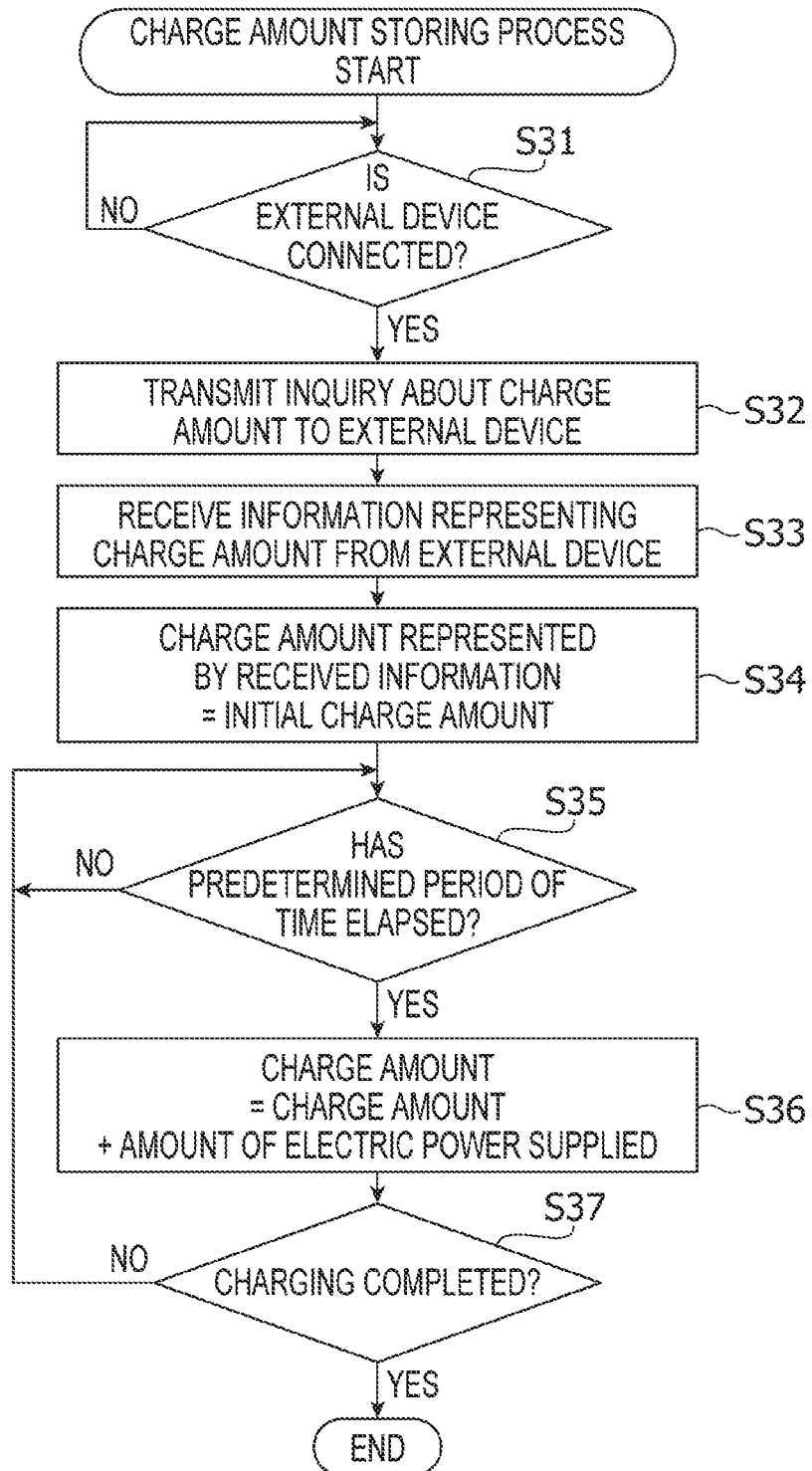
FIG. 3 is a flowchart showing a procedure of a charge amount storing process in the first illustrative embodiment according to one or more aspects of the present disclosure.

The RAM 23 is configured to store the charge amount C1 of the battery of the first device 2A in a charge amount storing process shown in FIG. 3. The charge amount C1 stored in the RAM 23 is used to determine whether the sum of the charge amount C1 and the first particular amount Cx is equal to or smaller than the charge amount C2. The charge amount storing process will be described later.

When determining that the sum of the charge amount C1 and the first particular amount Cx is equal to or smaller than the charge amount C2 (S15: Yes), the CPU 24 determines respective electric powers to be supplied to the first device 2A and the second device 2B via the USB I/F 15 in such a manner that the electric power to be supplied to the first device 2A via the USB I/F 15 is larger by a first particular value than the electric power to be supplied to the second device 2B (S16).

When determining that the sum of the charge amount C1 and the first particular amount Cx is larger than the charge amount C2 (S15: No), the CPU 24 determines whether a sum of the charge amount C1 of the battery of the first device 2A and a second particular amount Cy is equal to or smaller than the charge amount C2 of the battery of the second device 2B (S17). In other words, the CPU 24 determines whether the charge amount C1 of the battery of the first device 2A is smaller than the charge amount C2 of the battery of the second device 2B by the second particular amount Cy or more. The second particular amount Cy is set to be smaller than the first particular amount Cx.

When determining that the sum of the charge amount C1 and the second particular amount Cy is equal to or smaller than the charge amount C2 (S17: Yes), the CPU 24 determines respective electric powers to be supplied to the first device 2A and the second device 2B via the USB I/F 15 in such a manner that the electric power to be supplied to the first device 2A via the USB I/F 15 is larger by a second particular value than the electric power to be supplied to the second device 2B (S18). The second particular value is set to be smaller than the first particular value.

Therefore, when the sum of the charge amount C1 and the first particular amount Cx is larger than the charge amount C2, and the sum of the charge amount C1 and the second particular amount Cy is equal to or smaller than the charge amount C2, an electric power to be supplied to the second device 2B via the USB I/F 15 is determined in such a manner that a ratio of an electric power to be supplied to the first device 2A via the USB I/F 15 to the electric power to be supplied to the second device 2B is smaller than a ratio of an electric power to be supplied to the first device 2A via the USB I/F 15 to an electric power to be supplied to the second device 2B via the USB I/F 15 in a case where the sum of the charge amount C1 and the first particular amount Cx is smaller than the charge amount C2. Conversely, when the sum of the charge amount C1 and the first particular amount Cx is equal to or smaller than the charge amount C2, an electric power to be supplied to the second device 2B via the USB I/F 15 is determined in such a manner that a ratio of an electric power to be supplied to the first device 2A via the USB I/F 15 to the electric power to be supplied to the second device 2B is larger than a ratio of an electric power to be supplied to the first device 2A via the USB I/F 15 to an electric power to be supplied to the second device 2B via the USB I/F 15 in a case where the sum of the charge amount C1 and the first particular amount Cx is larger than the charge amount C2.

When determining that the sum of the charge amount C1 and the second particular amount Cy is larger than the charge amount C2 (S17: No), the CPU 24 sets the electric power to be supplied to the first device 2A to be identical to the electric power to be supplied to the second device 2B (S19).

Hence, when the sum of the charge amount C1 and the second particular amount Cy is larger than the charge amount C2, an electric power to be supplied to the second device 2B via the USB I/F 15 is determined in such a manner that a ratio of an electric power to be supplied to the first device 2A via the USB I/F 15 to the electric power to be supplied to the second device 2B is smaller than a ratio of an electric power to be supplied to the first device 2A via the USB I/F 15 to an electric power to be supplied to the second device 2B via the USB I/F 15 in a case where the sum of the charge amount C1 and the second particular amount Cy is equal to or smaller than the charge amount C2.

When determining that the second device 2B does not have a battery (S14: No), the CPU 24 determines whether the charge amount C1 of the battery of the first device 2A is smaller than a third particular amount Cz (S20).

When determining that the charge amount C1 of the battery of the first device 2A is smaller than the third particular amount Cz (S20: Yes), the CPU 24 determines respective electric powers to be supplied to the first device 2A and the second device 2B via the USB I/F 15 in such a manner that the electric power to be supplied to the first device 2A via the USB I/F 15 is larger by a third particular value than the electric power to be supplied to the second device 2B (S21).

The third particular value is set to be smaller than the first particular value. The third particular value may be identical to or different from the second particular value.

When determining that the charge amount C1 of the battery of the first device 2A is equal to or larger than the third particular amount Cz (S20: No), the CPU 24 sets the electric power to be supplied to the first device 2A via the USB I/F 15 to be identical to the electric power to be supplied to the second device 2B via the USB I/F 15 (S22).

Thus, after determining the electric power to be supplied to the second device 2B, the CPU 24 changes the electric power to be supplied to the first device 2A via the USB I/F 15 in such a manner that the determined electric power is supplied to the first device 2A and the second device 2B via the USB I/F 15, and starts supplying the electric power to the second device 2B (S23). Afterward, the CPU 24 terminates the power feeding control process.

It is noted that, when determining respective electric powers to be supplied to the first device 2A and the second device 2B via the USB I/F 15 in the steps S16, S18, S19, S21, and S21, the CPU 24 may determine the electric power to be supplied to the second device 2B via the USB I/F 15 so as to satisfy a magnitude relationship between the electric powers to be supplied to the first device 2A and the second device 2B, without changing the electric power to be supplied to the first device 2A via the USB I/F 15. In this case, when starting supplying the electric power to the second device 2B via the USB I/F 15, the CPU 24 does not change the electric power to be supplied to the first device 2A via the USB I/F 15.

Further, the CPU 24 may perform the steps S15 to S19 periodically at regular time intervals after starting supplying the electric power to the second device 2B via the USB I/F 15. Thereby, the CPU 24 may update as needed the respective electric powers to be supplied to the first device 2A and the second device 2B via the USB I/F 15. Thus, the CPU 24 may achieve appropriate power feeding management depending on charged states of the batteries of the first device 2A and the second device 2B.

In this case, in the steps S16 and S18, the CPU 24 may determine respective electric powers to be supplied to the first device 2A and the second device 2B via the USB I/F 15 so as to satisfy the magnitude relationship between the electric powers, by increasing or reducing the electric power to be supplied to the first device 2A and reducing or increasing the electric power to be supplied to the second device 2B. Alternatively, the CPU 24 may determine respective electric powers to be supplied to the first device 2A and the second device 2B via the USB I/F 15 so as to satisfy the magnitude relationship between the electric powers, by increasing or reducing one of the electric powers to be supplied to the first device 2A and the second device 2B.

<Charge Amount Storing Process>

As shown in FIG. 3, in the charge amount storing process, the CPU 24 determines whether an external device 2 having a battery is newly connected to the USB I/F 15 (S31). The determination in S31 is repeated until an external device 2 having a battery is connected to the USB I/F 15.

When determining that an external device 2 having a battery is newly connected to the USB I/F 15 (S31: Yes), the CPU 24 transmits, to the external device 2, an inquiry about a charge amount of the battery of the external device 2 (S32).

In response to the inquiry from the CPU 24, the external device 2 transmits information representing a charge amount of the battery of the external device 2. The CPU 24 receives the information from the external device 2 (S33).

The CPU 24 stores, into the RAM 23, the charge amount represented by the received information as an initial charge amount (S34).

Afterward, until the battery of the external device 2 is completely charged, with every lapse of a predetermined period of time (S35: Yes) (i.e., periodically at regular time intervals), the CPU 24 adds, to the charge amount stored in the RAM 32, an amount of an electric power supplied to the external device 2 via the USB I/F 15 within a predetermined past period of time immediately before the present time (S36). Further, the CPU 24 stores, into the RAM 23, the obtained total amount as an updated current charge amount of the battery of the external device 2.

The amount of the electric power supplied to the external device 2 via the USB I/F 15 within the predetermined (past) period of time may be calculated in the following manner. The CPU 24 detects a value of an electric current supplied to the first device 2A based on a detection signal from the electric current sensor 25, and calculates the electric power supplied to the first device 2A via the USB I/F 15 by multiplying the detected current value by a particular charge voltage. Then, the CPU 24 obtains a time integration value by multiplying the calculated electric power by the predetermined period of time, as the amount of the electric power supplied to the external device 2 via the USB I/F 15 within the predetermined period of time.

After completion of charging of the battery of the external device 2 (S37: Yes), the CPU 24 terminates the charge amount storing process.

<Operations and Advantageous Effects of First Illustrative Embodiment>

As described above, when the first device 2A having a battery and the second device 2B having a battery are connected with the USB I/F 15, it is determined whether the charge amount C1 of the battery of the first device 2A is smaller than the charge amount C2 of the battery of the second device 2B by the first particular amount Cx or more. In other words, in that case, it is determined whether the sum of the charge amount C1 of the battery of the first device 2A and the first particular amount Cx is equal to or smaller than the charge amount C2 of the battery of the second device 2B. When the sum of the charge amount C1 and the first particular amount Cx is equal to or smaller than the charge amount C2, a ratio of an electric power to be supplied to the first device 2A to an electric power to be supplied to the second device 2B is made larger than a ratio of an electric power to be supplied to the first device 2A to an electric power to be supplied to the second device 2B in a case where the sum of the charge amount C1 and the first particular amount Cx is larger than the charge amount C2. Thereby, when the charge amount C1 of the battery of the first device 2A is smaller than the charge amount C2 of the battery of the second device 2B by the first particular amount Cx or more, the electric power to be supplied to the first device 2A via the USB I/F 15 is larger than when the charge amount C1 is smaller than the charge amount C2 by smaller than the first particular amount Cx. Consequently, a period of time required for charging the battery of the first device 2A is shortened. Thus, it leads to better user-friendliness for a user who waits for the battery of the first device 2A to be charged.

In other words, the MFP 1 of the first illustrative embodiment may supply electricity to each of the first device 2A and the second device 2B with improved user-friendliness.

<Second Illustrative Embodiment>

Figure 4:
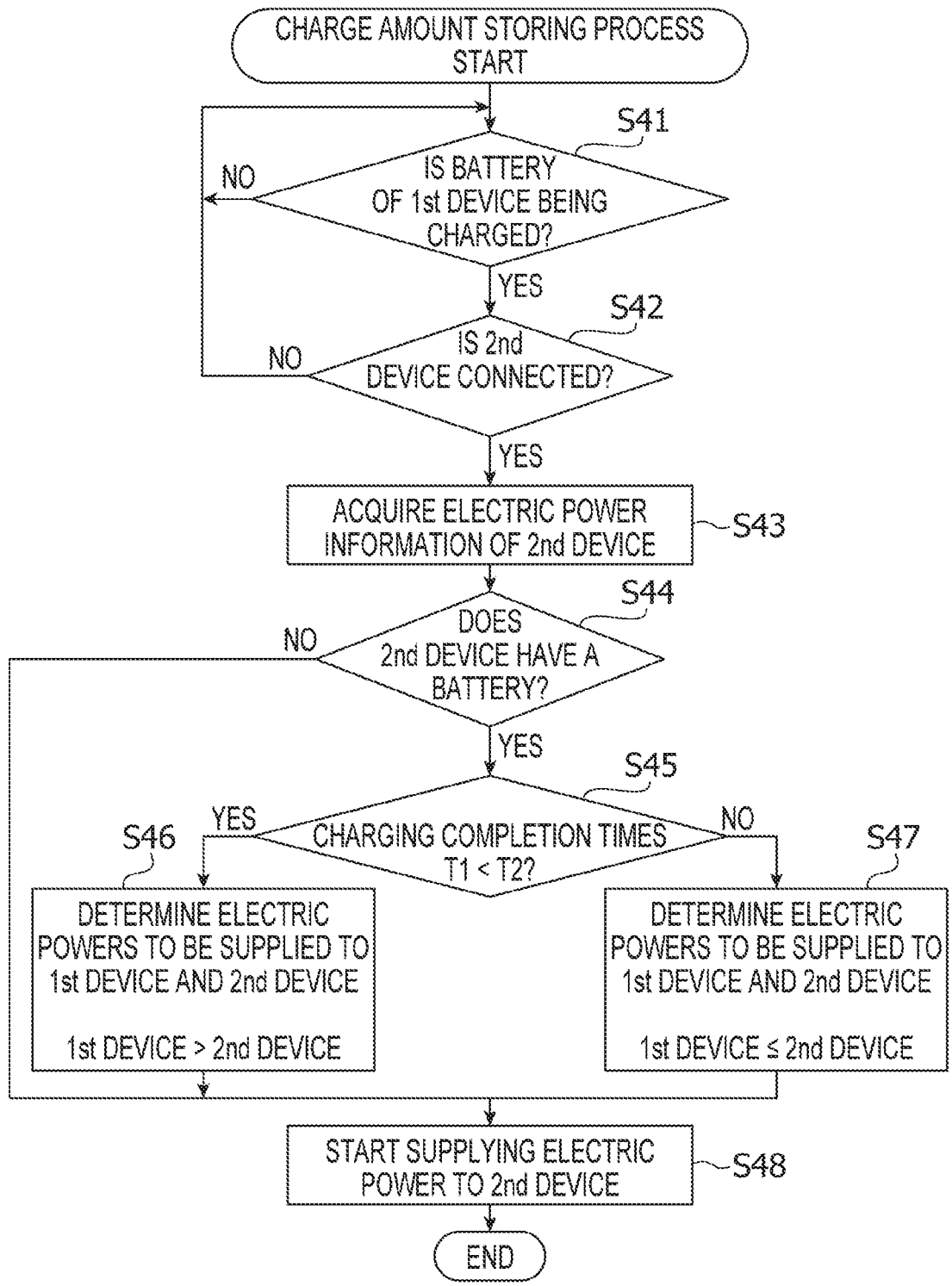
FIG. 4 is a flowchart showing a procedure of a power feeding control process in a second illustrative embodiment according to one or more aspects of the present disclosure.

Instead of the power feeding control process shown in FIG. 2, the CPU 24 may perform a power feeding control process shown in FIG. 4.

In the power feeding control process shown in FIG. 4, the CPU 24 determines whether the first device 2A is connected with the USB I/F 15 and whether the battery of the first device 2A is being charged by an electric power supplied to the first device 2A via the USB I/F 15 (S41).

When determining that the battery of the first device 2A is being charged (S41: Yes), the CPU 24 determines whether the second device 2B is connected to the USB I/F 15 (S42).

When determining that the second device 2B is not connected to the USB I/F 15 (S42: No), the CPU 24 again determines whether the battery of the first device 2A is being charged (S41).

When determining that the second device 2B is connected to the USB I/F 15 (S42: Yes), the CPU 24 acquires electric power information of the second device 2B (S43).

Specifically, the CPU 24 transmits, to the second device 2B, an inquiry about a charge amount of the battery of the second device 2B. When receiving from the second device 2B information representing the charge amount of the battery of the second device 2B within a particular period of time after transmission of the inquiry, the CPU 24 determines that the second device 2B has a battery (S44: Yes), and stores into the RAM 23 a charge amount C2 represented by the information received from the second device 2B. Meanwhile, when not receiving from the second device 2B information representing the charge amount of the battery of the second device 2B within the particular period of time after transmission of the inquiry, the CPU 24 determines that the second device 2B does not have a battery (S44: No).

When determining that the second device 2B has a battery (S44: Yes), the CPU 24 determines whether a charging completion time T1 for the battery of the first device 2A is earlier than a charging completion time T2 for the battery of the second device 2B (S45). The charging completion time T1 may be a setting time by which charging of the battery of the first device 2A needs to be completed. The charging completion time T2 may be a setting time by which charging of the battery of the second device 2B needs to be completed.

Each charging completion time may be previously set by the user operating the operation I/F 14 while watching a screen on the display 13.

As exemplified in FIG. 5, a charging completion time may be set for each of the USB ports P1, P2, and P3 of the USB I/F 15. When a charging completion time is set for each of the USB ports P1, P2, and P3 of the USB I/F 15, and for instance, an external device 2 is connected with the USB port P1, the charging completion time set for the USB port P1 is recognized as a charging completion time for the external device 2.

Further, as exemplified in FIG. 6, a charging completion time may be set for each external device 2. In a case where a specified external device 2 is connected to one of the USB ports P1, P2, and P3 of the USB I/F 15, when a specific charging completion time is set for the specified external device 2, it may be more user-friendly than when the charging completion time set for the one of the USB ports P1, P2, and P3 of the USB I/F 15 is recognized as a charging completion time for the specified external device 2. In such a case, when the specified external device 2 for which a charging completion time is previously set is connected to one of the USB ports P1, P2, and P3, the previously set charging completion time is recognized as a charging completion time for the specified external device 2, regardless of which one of the USB ports P1, P2, and P3 the specified external device 2 is connected to.

When determining that the charging completion time T1 is earlier than the charging completion time T2 (S45: Yes), the CPU 24 determines respective electric powers to be supplied to the first device 2A and the second device 2B via the USB I/F 15 in such a manner that the electric power to be supplied to the first device 2A is larger than the electric power to be supplied to the second device 2B (S46).

When determining that the charging completion time T1 is equal to or later than the charging completion time T2 (S45: No), the CPU 24 determines respective electric powers to be supplied to the first device 2A and the second device 2B via the USB I/F 15 in such a manner that the electric power to be supplied to the first device 2A is equal to or smaller than the electric power to be supplied to the second device 2B (S47).

When determining that the second device 2B does not have a battery (S44: No), the CPU 24 determines an electric power required by the second device 2B, as an electric power to be supplied to the second device 2B.

Thus, after determining the electric power to be supplied to the second device 2B via the USB I/F 15, the CPU 24 changes the electric power to be supplied to the first device 2A via the USB I/F 15 in such a manner that the determined electric power is supplied to the first device 2A and the second device 2B via the USB I/F 15, and starts supplying the determined electric power to the second device 2B via the USB I/F 15 (S48). Afterward, the CPU 24 terminates the power feeding control process.

It is noted that, when determining respective electric powers to be supplied to the first device 2A and the second device 2B via the USB I/F 15 in the steps S46 and S47, the CPU 24 may determine the electric power to be supplied to the second device 2B via the USB I/F 15 so as to satisfy a magnitude relationship between the electric powers to be supplied to the first device 2A and the second device 2B, without changing the electric power to be supplied to the first device 2A via the USB I/F 15. In this case, when starting supplying the electric power to the second device 2B via the USB I/F 15, the CPU 24 does not change the electric power to be supplied to the first device 2A via the USB I/F 15.

<Operations and Advantageous Effects of Second Illustrative Embodiment>

As described above, when the charging completion time T1 for the battery of the first device 2A is earlier than the charging completion time T2 for the battery of the second device 2B, the first device 2A is supplied with an electric power larger than an electric power to be supplied to the second device 2B via the USB I/F 15. Consequently, the CPU 24 may complete charging the battery of the first device 2A by the charging completion time T1. Meanwhile, when the charging completion time T2 for the battery of the second device 2B is equal to or earlier than the charging completion time T1 for the battery of the first device 2B, the second device 2B is supplied with an electric power equal to or larger than an electric power to be supplied to the first device 2A via the USB I/F 15. Consequently, the CPU 24 may complete charging the battery of the second device 2B by the charging completion time T2.

Thus, the MFP 1 of the second illustrative embodiment may supply electricity to each of the first device 2A and the second device 2B with improved user-friendliness.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of its versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modifications>

In the aforementioned first illustrative embodiment, the CPU 24 stores, into the RAM 23, the charge amount of the battery of the external device 2 in the charge amount storing process (see FIG. 3). Further, the CPU 24 uses the charge amount C1, stored in the RAM 23, of the battery of the first device 2A in the power feeding control process (see FIG. 2). Nonetheless, in the power feeding control process shown in FIG. 2, the CPU 24 may transmit, to the first device 2A, an inquiry about the charge amount C1 of the battery of the first device 2A as needed, and thereby receive, from the first device 2A, the charge amount C1 of the battery of the first device 2A.

The same applies to the charge amount C2 of the battery of the second device 2B.

In the aforementioned illustrative embodiments, aspects of the present disclosure have been applied to the MFP 1. Nonetheless, aspects of the present disclosure may be applied to apparatuses (e.g., printers and image scanners) each individually having a plurality of functions such as an image forming function to form an image on a sheet (e.g., a printing paper) and an image scanning function to scan an image of a document. Aspects of the present disclosure may be applied to electronic apparatuses each having an interface configured to supply electricity to a plurality of external devices.

Associations between elements exemplified in the aforementioned illustrative embodiments and elements according to aspects of the present disclosure may be exemplified as follows. The MFP 1 may be an example of an "electronic apparatus" according to aspects of the present disclosure. The USB I/F 15 may be an example of a "power-feedable interface" according to aspects of the present disclosure. The CPU 24 may be an example of a "controller" according to aspects of the present disclosure. Further, the "controller" according to aspects of the present disclosure may include the ROM 22 storing the programs 22A, as well as the CPU 24. The ROM 22 storing the programs 22A may be an example of a "non-transitory computer-readable medium storing computer-readable instructions" according to aspects of the present disclosure. In this case, the CPU 24 may be an example of a "processor" according to aspects of the present disclosure.

What is claimed is:

1. An electronic apparatus comprising:
   a power supply;
   a USB (Universal Serial Bus) interface configured to connect with a plurality of external devices and supply an electric power to each of the external devices connected with the USB interface, the plurality of external devices including a first device having a battery and a second device; and
   a controller configured to:
      when the first device and the second device are connected with the USB interface and the second device has a battery, determine whether the first device satisfies a first condition concerning charging of the battery of the first device, wherein the first condition includes a requirement that a first charge amount of the battery of the first device is smaller than a second charge amount of the battery of the second device by a first particular amount or more; and
      in response to determining that the first device satisfies the first condition, set a specific ratio larger than when it is determined that the first device does not satisfy the first condition, the specific ratio being a ratio of an electric power to be supplied to the first device from the power supply via the USB interface, to an electric power to be supplied to the second device from the power supply via the USB interface;
      in response to determining that the first device does not satisfy the first condition, determine whether a second condition is satisfied, the second condition including a requirement that the first charge amount is smaller than the second charge amount by a second particular amount or more, the second particular amount being smaller than the first particular amount; and
      in response to determining that the second condition is not satisfied, make the specific ratio smaller than when it is determined that the second condition is satisfied,
   wherein the controller is further configured to:
      calculate the first charge amount at a time when it is determined whether the second condition is satisfied, by adding a time integration value of an electric power supplied to the first device via the USB interface to the first charge amount at a time when the first device is connected to the USB interface; and
      calculate the second charge amount at the time when it is determined whether the second condition is satisfied, by adding a time integration value of an electric power supplied to the second device via the USB interface to the second charge amount at a time when the second device is connected to the USB interface.

2. The electronic apparatus according to claim 1, wherein the controller is further configured to, in response to determining that the first device satisfies the first condition, make the electric power to be supplied to the first device via the USB interface larger than when it is determined that the first device does not satisfy the first condition.

3. The electronic apparatus according to claim 1, wherein the controller is further configured to, in response to determining that the first device satisfies the first condition, make the electric power to be supplied to the second device via the USB interface smaller than when it is determined that the first device does not satisfy the first condition.

4. The electronic apparatus according to claim 1, wherein the controller is further configured to, in response to determining that the second condition is not satisfied, set the electric power to be supplied to the first device via the USB interface to be identical to the electric power to be supplied to the second device via the USB interface.

5. The electronic apparatus according to claim 1, wherein the first condition further includes a requirement that a first charging completion time for the battery of the first device is earlier than a second charging completion time for the battery of the second device.

6. The electronic apparatus according to claim 5, further comprising an acceptor configured to accept the first charging completion time and the second charging completion time.

7. The electronic apparatus according to claim 6, wherein the USB interface has a plurality of ports each connectable with one of the plurality of external devices, and
wherein the acceptor is further configured to accept a charging completion time for each of the ports.

8. The electronic apparatus according to claim 1, wherein the controller is further configured to, when the second device does not have a battery, determine whether the first device satisfies the first condition, and
wherein the first condition includes a requirement that a first charge amount of the battery of the first device is smaller than a particular value.

9. The electronic apparatus according to claim 1, wherein the controller is further configured to:
   in response to an external device having a battery being newly connected to the USB interface, transmit to the newly-connected external device an inquiry about a charge amount of the battery of the newly-connected external device; and
   receive, from the newly-connected external device, the charge amount of the battery of the newly-connected external device.

* * * * *